(12) United States Patent
Choi et al.

(10) Patent No.: US 11,909,060 B2
(45) Date of Patent: Feb. 20, 2024

(54) TAPING APPARATUS AND METHOD FOR SECONDARY BATTERY

(71) Applicant: SK Innovation Co., Ltd., Seoul (KR)

(72) Inventors: Gil Yong Choi, Daejeon (KR); Joo Hyung Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 21 days.

(21) Appl. No.: 17/374,353

(22) Filed: Jul. 13, 2021

(65) Prior Publication Data
US 2022/0013844 A1    Jan. 13, 2022

(30) Foreign Application Priority Data
Jul. 13, 2020    (KR) .................. 10-2020-0086164

(51) Int. Cl.
*H01M 50/186*    (2021.01)
*H01M 50/26*    (2021.01)
*H01M 50/198*    (2021.01)
*H01M 10/04*    (2006.01)
*B65H 37/04*    (2006.01)

(52) U.S. Cl.
CPC ............ *H01M 50/26* (2021.01); *B65H 37/04* (2013.01); *H01M 10/0404* (2013.01); *H01M 50/186* (2021.01); *H01M 50/198* (2021.01)

(58) Field of Classification Search
CPC .................................................. H01M 50/186
See application file for complete search history.

(56) References Cited

FOREIGN PATENT DOCUMENTS

| JP | 5-77185 | A | * | 3/1993 |
|---|---|---|---|---|
| JP | 3494607 | B2 | | 2/2004 |
| JP | 2018-73631 | A | * | 5/2018 |
| KR | 10-2012-0069905 | A | * | 6/2012 |
| KR | 10-2012-0069905 | A | | 6/2012 |
| KR | 10-2018-0089014 | A | | 8/2018 |
| KR | 10-1938709 | B1 | | 1/2019 |
| WO | 2019/103302 | A1 | | 5/2019 |
| WO | WO-2020/222529 | A1 | * | 11/2020 |

OTHER PUBLICATIONS

Extended European Search Report issued by the European Patent Office dated Dec. 6, 2021.

* cited by examiner

*Primary Examiner* — Jeffry H Aftergut
(74) *Attorney, Agent, or Firm* — IP & T GROUP LLP (57) ABSTRACT

A taping apparatus for a secondary battery, configured to adhere an adhesive member cut and provided as a single sheet to a secondary battery cell including an accommodating portion in which an electrode assembly is accommodated and a sealing portion folded in a direction of the accommodating portion and sealing an edge of the accommodating portion, includes a support unit supporting a portion of the adhesive member; and a roller unit continuously moving in at least one direction of the accommodating portion and the sealing portion and adhering the adhesive member supported by the support unit to the secondary battery cell.

12 Claims, 10 Drawing Sheets

TAPING APPARATUS AND METHOD FOR SECONDARY BATTERY

CROSS-REFERENCE TO RELATED APPLICATION(S)

This application claims benefit of priority to Korean Patent Application No. 10-2020-0086164 filed on Jul. 13, 2020 in the Korean Intellectual Property Office, the disclosure of which is incorporated herein by reference in its entirety.

BACKGROUND

1. Field

The present disclosure relates to a taping apparatus for a secondary battery and a taping method for a secondary battery.

2. Description of Related Art

As technological development and demand for mobile devices, electric vehicles, and the like increase, demand for a secondary battery cell as an energy source is rapidly increasing. Such a secondary battery cell may be a battery that repeatedly charges and discharges electricity, because mutual conversion between chemical energy and electrical energy are reversible.

Such a secondary battery cell may include an electrode assembly including a positive electrode, a negative electrode, a separator, an electrolyte, and the like, which may be major components of a secondary battery, and a cell body member of a laminated film case protecting the electrode assembly.

In this case, the cell body member may form a sealing portion while sealing an edge of an accommodating portion in which the electrode assembly is accommodated. The sealing portion may be folded in a direction of the accommodating portion.

However, even though the sealing portion is folded in the direction of the accommodating portion, there may be a problem in which the sealing portion is not fully in contact with the accommodating portion due to a spring back.

In order to prevent such a spring back, a method of attaching a piece of tape to the secondary battery cell so that the sealing portion is in close contact with the accommodating portion may be considered. Even in this case, there may be additional problems that a piece of tape is not stably attached to a secondary battery cell, a piece of tape is detached therefrom, or the like.

Therefore, in order to improve the above-described problems or limitations, research into a battery module is required.

SUMMARY

An aspect of the present disclosure is to provide a taping apparatus for a secondary battery and a taping method for a secondary battery, capable of attaching a piece of tape to a secondary battery cell in order to prevent a spring back.

Another aspect of the present disclosure is to provide a taping apparatus for a secondary battery and a taping method for a secondary battery, capable of stably attaching an adhesive member to a secondary battery cell and preventing the occurrence of a problem in which the adhesive member is detached therefrom.

According to an aspect of the present disclosure, a taping apparatus for a secondary battery, configured to adhere an adhesive member cut and provided as a single sheet to a secondary battery cell including an accommodating portion in which an electrode assembly is accommodated and a sealing portion folded in a direction of the accommodating portion and sealing an edge of the accommodating portion, includes a support unit supporting a portion of the adhesive member; and a roller unit continuously moving in at least one direction of the accommodating portion and the sealing portion and adhering the adhesive member supported by the support unit to the secondary battery cell.

In this case, in the taping apparatus, the roller unit may include a first multi-roller moving while closely pressing the adhesive member in a direction of one surface of the accommodating portion; and a second multi-roller moving while closely pressing the adhesive member in a direction of the other surface of the accommodating portion.

Alternatively, in the taping apparatus, the roller unit may include a single roller moving while closely pressing the adhesive member adhered to and supported on one surface of the accommodating portion by the support unit, in a direction of the sealing portion and in a direction of the other surface of the accommodating portion.

In addition, in the taping apparatus, the support unit may include an adsorption temporary adhering unit adsorbing the adhesive member to move in a direction of the secondary battery cell, and adhering a portion of the adhesive member to the secondary battery cell; and a fully adhering supporter disposed to be spaced apart from the adsorption temporary adhering unit by a predetermined distance and provided adjacent to the roller unit.

In this case, in the taping apparatus, the adsorption temporary adhering unit may include a temporary adhering head having a negative pressure flow path formed on one surface of the adhesive member and connected to an external negative pressure forming portion; and a temporary adhering cylinder coupled to the temporary adhering head and moving the temporary adhering head in a direction of the secondary battery cell.

In addition, in the taping apparatus, the negative pressure flow path may be formed on one surface of the temporary adhering head contacting the adhesive member, and formed to have a mesh shape or a radial shape.

Further, in the taping apparatus, the temporary adhering head may be formed to have a flat shape or a concave shape on one surface with which the adhesive member is in contact.

In addition, in the taping apparatus, the temporary adhering head may include a discharge terminal connected to a ground and provided on one surface with which the adhesive member is in contact, to discharge electrostatic charges of the adhesive member to the ground.

Furthermore, in the taping apparatus, the temporary adhering cylinder may elastically pressurize the temporary adhering head in the direction of the secondary battery cell.

In addition, in the taping apparatus, the fully adhering supporter may include a support head in close contact with a portion of the adhesive member attached to the secondary battery cell by the adsorption temporary adhering unit; and a support cylinder coupled to the support head and pressurizing the support head in the direction of the secondary battery cell.

In this case, in the taping apparatus, the support cylinder may elastically pressurize the support head in the direction of the secondary battery cell.

Furthermore, in the taping apparatus, the support head may include a support block formed of a urethane material or a sponge material.

In addition, in the taping apparatus, the support head may include a support frame coupled to the support cylinder; and a plurality of support fingers provided on the support frame and elastically pressurized in an outward direction.

Alternatively, in the taping apparatus, the support unit may include an adsorption supporter adsorbing the adhesive member to move in a direction of the secondary battery cell, and supporting in a state in which a portion of the adhesive member is pressurized in the direction of the secondary battery cell to be adhered to the secondary battery cell, while the roller unit closely presses the adhesive member against the secondary battery cell.

According to an aspect of the present disclosure, a taping method for a secondary battery, configured to adhere an adhesive member cut and provided as a single sheet to a secondary battery cell including an accommodating portion in which an electrode assembly is accommodated and a sealing portion folded in a direction of the accommodating portion and sealing an edge of the accommodating portion, includes a supporting operation of supporting a portion of the adhesive member; and an adhering operation of adhering the partially supported adhesive member to the accommodating portion and the sealing portion.

In this case, in the taping method, the adhering operation may include a multi-adhering operation of adhering the adhesive member supported by the sealing portion to both surfaces of the accommodating portion.

Alternatively, in the taping method, the adhering operation may include a single adhering operation of sequentially adhering the adhesive member supported on one surface of the accommodating portion to the sealing portion and the other surface of the accommodating portion.

In addition, in the taping method, the supporting operation may include an adsorption operation of adsorbing the adhesive member; a temporary adhering operation of moving the adhesive member in a direction of the secondary battery cell and adhering a portion of the adhesive member to the secondary battery cell; a cell moving operation of moving the secondary battery cell to a position in which the roller unit performing the adhering operation is disposed; and a pressurization operation of pressurizing a portion of the adhesive member attached to the secondary battery cell in the direction of the secondary battery cell.

Alternatively, in the taping method, the supporting operation may include an adsorption operation of adsorbing the adhesive member; and a pressurization operation of moving the adhesive member in a direction of the secondary battery cell, and adhering a portion of the adhesive member to the secondary battery cell and simultaneously pressurizing the portion of the adhesive member in the direction of the secondary battery cell.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, preferred embodiments of the present disclosure will be described with reference to the accompanying drawings. However, embodiments of the present disclosure may be modified into various other forms, and the scope of the present disclosure is not limited to the embodiments described below. In addition, embodiments of the present disclosure may be provided in order to more completely explain the present disclosure to those with average knowledge in the art. In the drawings, shapes and sizes of elements may be exaggerated for clarity.

In addition, in the present specification, it should be understood that singular expressions include plural expressions unless clearly defined otherwise in the context, and reference numerals given in the same reference numerals or in a similar manner throughout the specification refer to the same elements or corresponding elements.

The present disclosure relates to a taping apparatus 1 for a secondary battery and a taping method for a secondary battery, and a piece of tape may be attached to a secondary battery cell 2 to prevent a spring back.

First, referring to the taping apparatus 1 for a secondary battery of the present disclosure, the taping apparatus 1 of the present disclosure may include a roller unit 200 for attaching a piece of tape to the secondary battery cell 2.

In another aspect, the taping apparatus 1 of the present disclosure may stably attach an adhesive member 3 to the secondary battery cell 2, and may prevent occurrence of a problem in which the adhesive member 3 is detached therefrom. To this end, the taping apparatus 1 of the present disclosure may include a support unit 100.

In this case, the adhesive member 3 may include a piece of tape as an example, and in particular, an insulating tape.

In addition, the secondary battery cell 2 may include an electrode assembly and a cell body member surrounding the electrode assembly. The cell body member may include an accommodating portion 2a in which the electrode assembly is accommodated, and a sealing portion 2b for sealing a peripheral portion of the accommodating portion 2a.

The electrode assembly may substantially include an electrolyte, and may be accommodated and used in the cell body member together. The electrolyte may include a lithium salt such as $LiPF_6$, $LiBF_4$, or the like in an organic solvent such as ethylene carbonate (EC), propylene carbonate (PC), diethyl carbonate (DEC), ethyl methyl carbonate (EMC), dimethyl carbonate (DMC), or the like. Furthermore, the electrolyte may be present as a liquid phase, a solid phase, or a gel phase.

In addition, the cell body member may protect the electrode assembly, and may accommodate the electrolyte. For example, the cell body member may be provided as a pouch-shaped member or a can-shaped member. In this case, the pouch-shaped member may be configured by sealing and accommodating three or four surfaces of an electrode assembly, and may be a member configured by overlapping and adhering three surfaces, e.g., an upper surface and both side surfaces, excluding one surface, which may generally be a lower surface, in a state in which the electrode assembly is accommodated therein. In addition, the can-shaped member may be configured by sealing and accommodating one surface of an electrode assembly, and may be a member configured by overlapping and adhering one surface, e.g., an upper surface, excluding three surfaces, which may generally be a lower surface and both side surfaces, in a state in which the electrode assembly is accommodated therein.

As above, a pouch-shaped secondary battery cell 2 and a can-shaped secondary battery cell 2 may be only examples of a secondary battery cell 2 to be accommodated in a battery module of the present disclosure, and a secondary battery cell 2 to be accommodated in a battery module of the present disclosure is not limited thereto.

Figure 1:
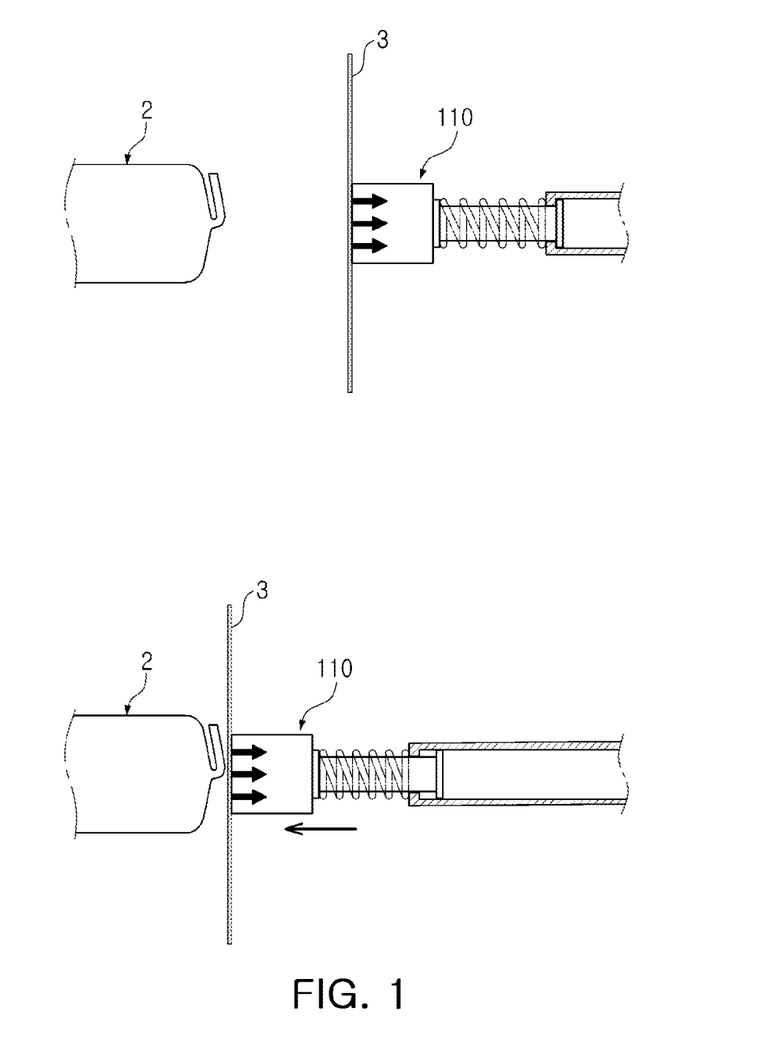
FIG. 1 is a side view illustrating an adsorption temporary adhering unit of a support unit in an embodiment in which a roller unit of a taping apparatus for a secondary battery of the present disclosure includes a first multi-roller and a second multi-roller.
Figure 2:
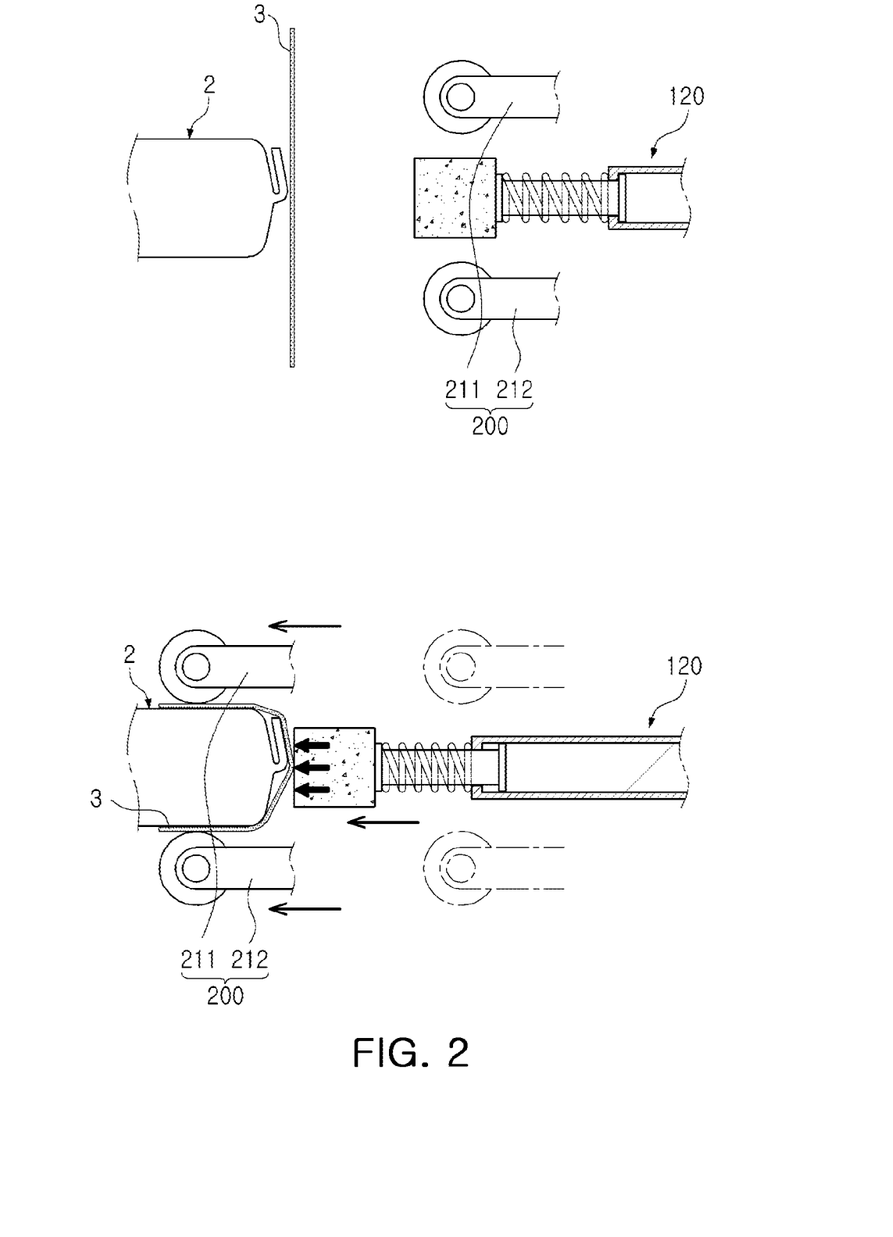
FIG. 2 is a side view illustrating a fully adhering supporter of a support unit in an embodiment in which a roller unit of a taping apparatus for a secondary battery of the present disclosure includes a first multi-roller and a second multi-roller.
Figure 3:
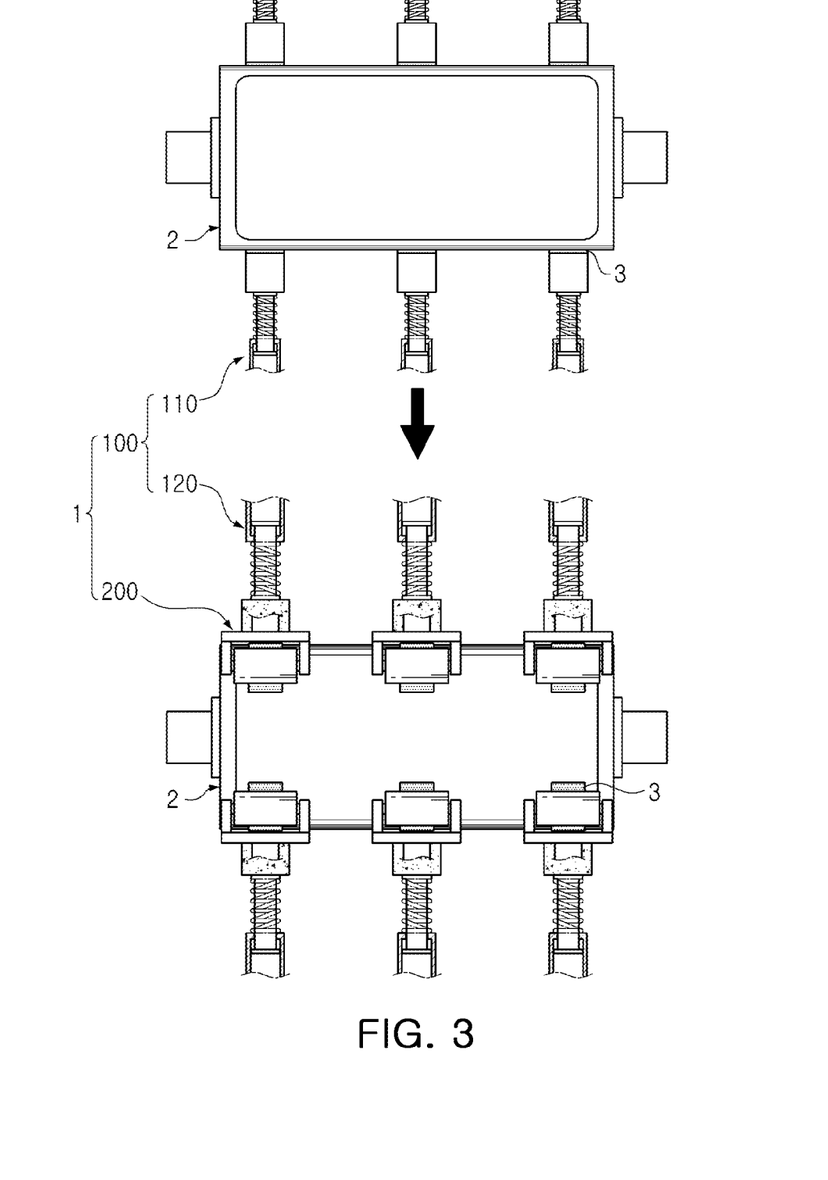
FIG. 3 is a plan view illustrating a support unit in an embodiment in which a roller unit of a taping apparatus for a secondary battery of the present disclosure includes a first multi-roller and a second multi-roller.
Figure 4:
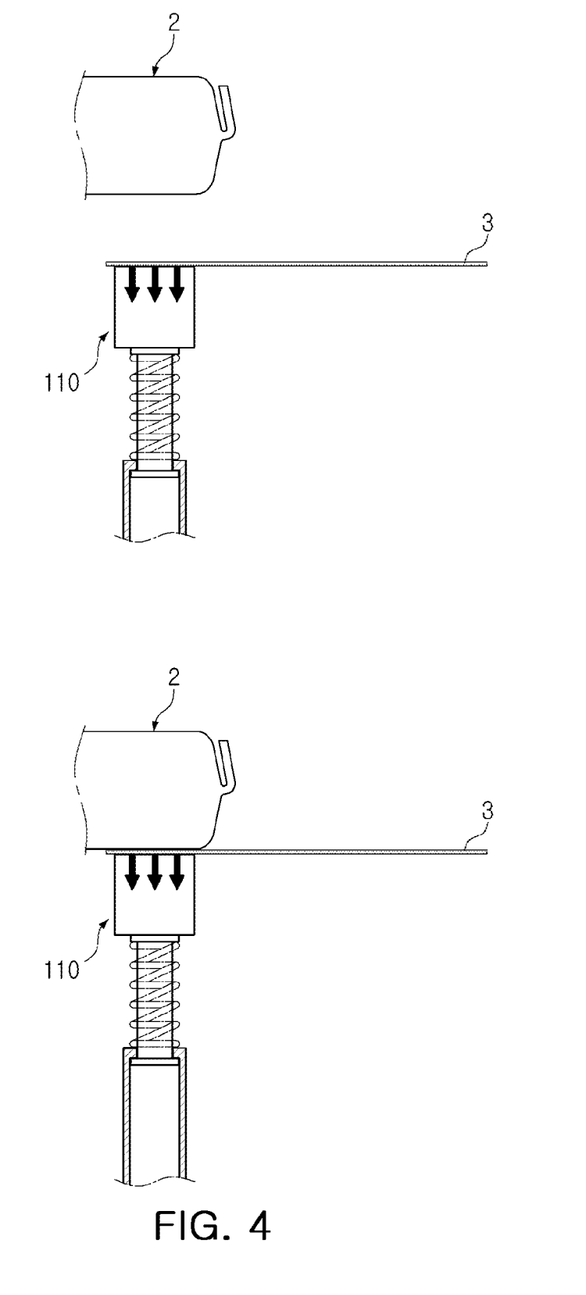
FIG. 4 is a side view illustrating an adsorption temporary adhering unit of a support unit in an embodiment in which a roller unit of a taping apparatus for a secondary battery of the present disclosure includes a single roller.
Figure 5:
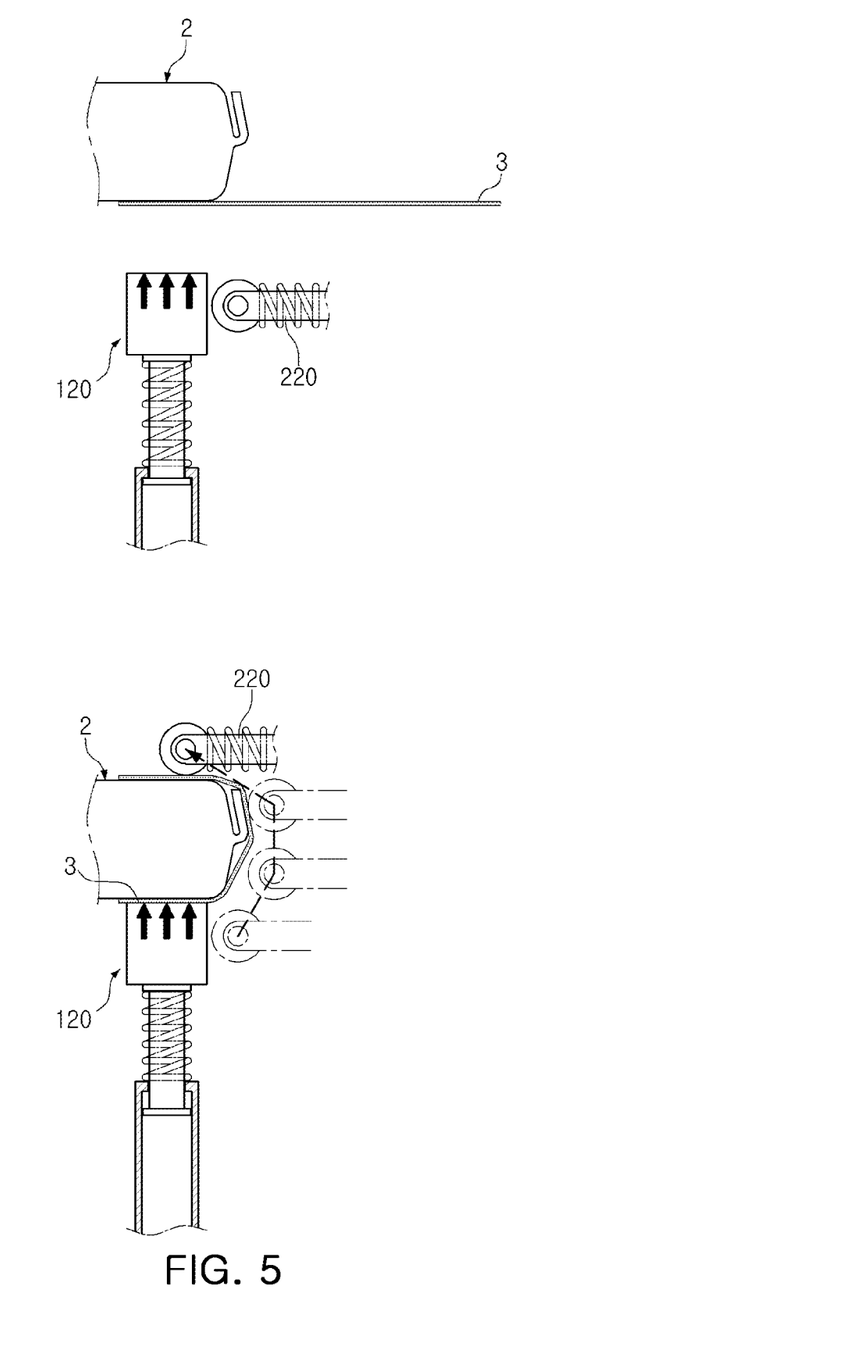
FIG. 5 is a side view illustrating a fully adhering supporter of a support unit in an embodiment in which a roller unit of a taping apparatus for a secondary battery of the present disclosure includes a single roller.

Specifically, referring to the drawings, in a taping apparatus 1 of the present disclosure, an embodiment in which two rollers are used in a roller unit 200 for taping an adhesive member 3 to attach the adhesive member 3 to a secondary battery cell 2 is illustrated in FIGS. 1 to 3, and an embodiment in which one roller is used in the roller unit 200 is illustrated in FIGS. 4 and 5.

For example, FIG. 1 is a side view illustrating an adsorption temporary adhering unit 110 of a support unit 100 in an embodiment in which a roller unit 200 of a taping apparatus 1 for a secondary battery of the present disclosure includes a first multi-roller 211 and a second multi-roller 212, FIG. 2 is a side view illustrating a fully adhering supporter 120 of a support unit 100 in an embodiment in which a roller unit 200 of a taping apparatus 1 for a secondary battery of the present disclosure includes a first multi-roller 211 and a second multi-roller 212, and FIG. 3 is a plan view illustrating a support unit 100 in an embodiment in which a roller unit 200 of a taping apparatus 1 for a secondary battery of the present disclosure includes a first multi-roller 211 and a second multi-roller 212.

FIG. 4 is a side view illustrating an adsorption temporary adhering unit 110 of a support unit 100 in an embodiment in which a roller unit 200 of a taping apparatus 1 for a secondary battery of the present disclosure includes a single roller 220, and FIG. 5 is a side view illustrating a fully adhering supporter 120 of a support unit 100 in an embodiment in which a roller unit 200 of a taping apparatus 1 for a secondary battery of the present disclosure includes a single roller 220.

Figure 11:
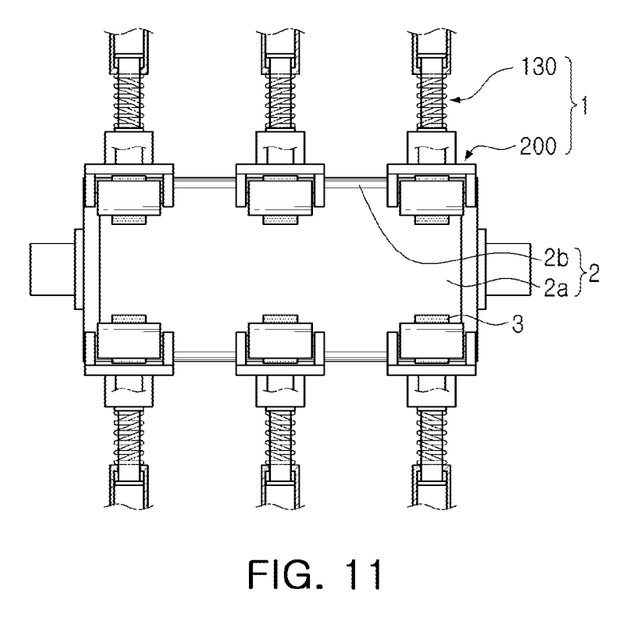
FIG. 11 is a plan view illustrating an embodiment in which a support unit includes an adsorption supporter in a taping apparatus for a secondary battery of the present disclosure.

In addition, FIGS. 1 to 5 are embodiments in which a support unit 100 for supporting an adhesive member 3 includes an adsorption temporary adhering unit 110 and a fully adhering supporter 120. For reference, an embodiment in which a support unit 100 includes an adsorption supporter 130 simultaneously serving as an adsorption temporary adhering unit 110 and a fully adhering supporter 120 is illustrated in FIG. 11.

Referring to such drawings, a taping apparatus 1 for a secondary battery according to an embodiment of the present disclosure, configured to adhere an adhesive member 3 cut and provided as a single sheet to a secondary battery cell 2 including an accommodating portion 2a in which an electrode assembly is accommodated and a sealing portion 2b folded in a direction of the accommodating portion 2a and sealing an edge of the accommodating portion 2a, may include a support unit 100 and a roller unit 200.

In this case, the support unit 100 may support a portion of the adhesive member 3. In addition, the roller unit 200 may be continuously moved in at least one of the accommodating portion 2a and the sealing portion 2b, and may adhere the adhesive member 3 supported by the support unit 100 to the secondary battery cell 2. By attaching the adhesive member 3 in this manner, the sealing portion 2b may be brought into close contact with the accommodating portion 2a.

The support unit 100 may serve to stably attach an adhesive member 3 to a secondary battery cell 2, and prevent a problem in which the adhesive member 3 is detached therefrom.

For example, the support unit 100 may support a portion of the adhesive member 3 while allowing the portion of the adhesive member 3 to be attached to the secondary battery cell 2. Therefore, in a conventional process of attaching the adhesive member 3, a problem in which the adhesive member 3 is detached, a problem in which the adhesive member 3 is not adhered stably but is crooked and adhered, or the like may be prevented.

To this end, the support unit 100 may include an adsorption temporary adhering unit 110 serving to attach a portion of the adhesive member 3 to the secondary battery cell 2, and a fully adhering supporter 120 serving to support a portion of the adhesive member 3 on the secondary battery cell 2.

For example, the support unit 100 of the taping apparatus 1 according to an embodiment of the present disclosure may include the adsorption temporary adhering unit 110 and the fully adhering supporter 120.

The adsorption temporary adhering unit 110 may adsorb the adhesive member 3, and may be moved in the direction of the secondary battery cell 2, and a portion of the adhesive member 3 may be adhered to the secondary battery cell 2. The fully adhering supporter 120 may be disposed to be spaced apart from the adsorption temporary adhering unit 110 by a predetermined distance, and may be provided adjacent to the roller unit 200.

In addition, while the roller unit 200 closely presses a remaining portion of the adhesive member 3 spaced apart from the secondary battery cell 2 against the secondary battery cell 2, a portion of the adhesive member 3 attached to the secondary battery cell 2 may be supported by being pressurized by the adsorption temporary adhering unit 110 in the direction of the secondary battery cell 2.

For example, when the adhesive member 3 is temporarily adhered to the secondary battery cell 2 by the adsorption temporary adhering unit 110, the secondary battery cell 2 may be moved to a position in which the fully adhering supporter 120 is disposed, and the adhesive member 3 may be fully attached to the secondary battery cell 2 by the roller unit 200 while being supported by the fully adhering supporter 120. This can be easily seen with reference to FIG. 3.

In this manner, the adsorption temporary adhering unit 110 may hold the adhesive member 3 by forming negative pressure, or like, and may then adhere a portion of the adhesive member 3 to the secondary battery cell 2. Therefore, before the roller unit 200 fully attaches the adhesive member 3 to the secondary battery cell 2, the adhesive member 3 may be temporarily adhered to the secondary battery cell 2.

To this end, the adsorption temporary adhering unit 110 may include a temporary adhering head 111 and a temporary adhering cylinder 112, which will be described later with reference to FIG. 6.

In addition, the fully adhering supporter 120 may serve to support the adhesive member 3 while the adhesive member 3 is fully attached to the secondary battery cell 2 by the roller unit 200. For example, while the roller unit 200 closely presses the secondary battery cell 2 and attaches the adhesive member 3 to the secondary battery cell 2, the fully adhering supporter 120 may serve as a support point to more stably attach the adhesive member 3 to the secondary battery cell 2.

To this end, the fully adhering supporter 120 may include a support head 121 and a support cylinder 122, which will be described later with reference to FIG. 9.

According to an embodiment including an adsorption supporter 130, the support unit 100 may perform a role of temporarily adhering the adhesive member 3 to the secondary battery cell 2, and simultaneously of supporting the adhesive member 3 while the roller unit 200 fully attaches the adhesive member 3 to the secondary battery cell 2, and a detailed description thereof will be described later with reference to FIG. 11.

The roller unit 200 may serve to fully attach the adhesive member 3 supported by the secondary battery cell 2 by the support unit 100 to the secondary battery cell 2.

For example, the roller unit 200 may serve to attach the adhesive member 3 closely adhering the sealing portion 2b to the accommodating portion 2a to the accommodating portion 2a and the sealing portion 2b of the secondary battery cell 2, to prevent occurrence of a spring back in the sealing portion 2b.

To this end, the roller unit 200 may include a first multi-roller 211 and a second multi-roller 212 as an embodiment including two rollers, or may include a single roller 220 as an embodiment including one roller.

Embodiments in which the roller unit 200 includes a first multi-roller 211 and a second multi-roller 212 may be referred to FIGS. 1 to 3.

As such, the roller unit 200 of the taping apparatus 1 according to an embodiment of the present disclosure may include a first multi-roller 211 and a second multi-roller 212.

In this case, the first multi-roller 211 may move while closely pressing the adhesive member 3 in a direction of one surface of the accommodating portion 2a. In addition, the second multi-roller 212 may move while closely pressing the adhesive member 3 in a direction of the other surface of the accommodating portion 2a.

In this case, while the adhesive member 3 is fully adhered to the secondary battery cell 2 by the first multi-roller 211 and the second multi-roller 212, a portion of the adhesive member 3 may be supported by the fully adhering supporter 120 or the adsorption supporter 130 of the support unit 100.

In this case, the fully adhering supporter 120 or the adsorption supporter 130 may support the adhesive member 3 temporarily adhered to the sealing portion 2b, and the first multi-roller 211 and the second multi-roller 212 may adhere the adhesive member 3 to the secondary battery cell 2 while sliding on a surface of the accommodating portion 2a.

In addition, the first multi-roller 211 and the second multi-roller 212 may move along paths which are horizontal each other and may attach the adhesive member 3 to the secondary battery cell 2 as the same length, and may move at speeds synchronized with each other.

An embodiment in which the roller unit 200 may include a single roller 220 may be referred to FIGS. 4 and 5.

As such, the roller unit 200 of the taping apparatus 1 according to an embodiment of the present disclosure may include a single roller 220.

In this case, the single roller 220 may move while closely pressing the adhesive member 3 adhered to and supported on one surface of the accommodating portion 2a by the support unit 100, in a direction of the sealing portion 2b and in a direction of the other surface of the accommodating portion 2a.

In this case, while the adhesive member 3 is fully adhered to the secondary battery cell 2 by the single roller 220, a portion of the adhesive member 3 may be supported by the fully adhering supporter 120 or the adsorption supporter 130 of the support unit 100.

In this case, the fully adhering supporter 120 or the adsorption supporter 130 may support the adhesive member 3 temporarily adhered to one surface of the accommodating portion 2a, and the single roller 220 may adhere the adhesive member 3 to the secondary battery cell 2 while sliding on the sealing portion 2b and the other surface of the accommodating portion 2a.

In addition, the single roller 220 may be configured to elastically press the adhesive member 3 closely against the secondary battery cell 2, to fully press the adhesive member 3 against the secondary battery cell 2 and attach the adhesive member 3 to the secondary battery cell 2.

Figure 6:
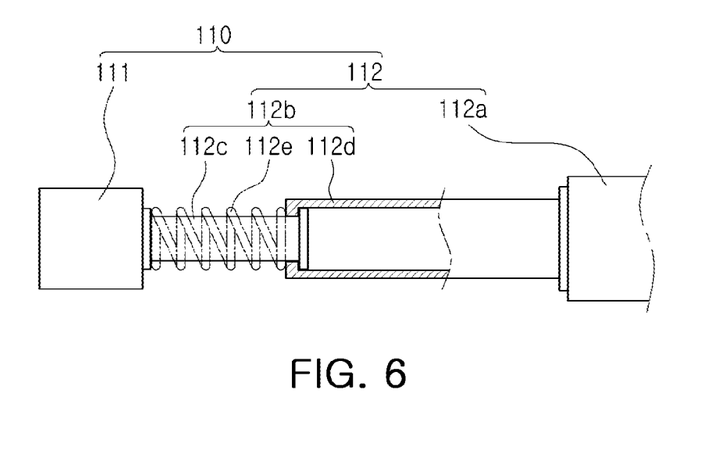
FIG. 6 is a side view illustrating an adsorption temporary adhering unit in a taping apparatus for a secondary battery of the present disclosure.

FIG. 6 is a side view illustrating an adsorption temporary adhering unit 110 in a taping apparatus 1 for a secondary battery of the present disclosure. Referring to the drawings, an adsorption temporary adhering unit 110 of a taping apparatus 1 for a secondary battery according to an embodiment of the present disclosure may include a temporary adhering head 111 and a temporary adhering cylinder 112.

The temporary adhering head 111 may have a negative pressure flow path 111a formed on one surface of an adhesive member 3, and may be connected to an external negative pressure forming portion N. In addition, the temporary adhering cylinder 112 may be coupled to the temporary adhering head 111, and the temporary adhering head 111 may be moved in a direction of a secondary battery cell 2.

In this case, the negative pressure flow path 111a formed on one surface of the temporary adhering head 111 may be formed on an entire surface of the temporary adhering head 111, to secure an area for adsorbing the adhesive member 3 as much as possible, and a detailed description thereof will be described later with reference to FIG. 7.

In addition, the temporary adhering head 111 may be formed to have a flat shape or a concave shape on one surface of the temporary adhering head 111, which will be described later with reference to FIG. 8.

In addition, the temporary adhering cylinder 112 of the taping apparatus 1 according to an embodiment of the present disclosure may elastically pressurize the temporary adhering head 111 in the direction of the secondary battery cell 2.

Therefore, even when a shape of a portion of the secondary battery cell 2 to which the adhesive member 3 is temporarily adhered is irregular, the adhesive member 3 may be stably temporarily adhered thereto.

To this end, the temporary adhering cylinder 112 may include a temporary adhering cylinder body 112a and a temporary adhering rod 112b, and the temporary adhering rod 112b may include a temporary adhering inner rod 112c, a temporary adhering outer rod 112d, and a temporary adhering buffer spring 112e.

In this case, the temporary adhering head 111 may be coupled to the temporary adhering rod 112b, and the temporary adhering cylinder body 112a may be connected to the temporary adhering rod 112b, to expand and contract the temporary adhering rod 112b.

In addition, the temporary adhering head 111 may be coupled to one end portion of the temporary adhering inner rod 112c, the other end portion of the temporary adhering inner rod 112c may be inserted into the temporary adhering outer rod 112d, at least a portion of the temporary adhering outer rod 112d may be inserted into the temporary adhering cylinder body 112a, and the temporary adhering buffer spring 112e may be disposed between the temporary adhering inner rod 112c and the temporary adhering outer rod 112d, and may elastically pressurize the temporary adhering inner rod 112c in an outward direction.

Figure 7:
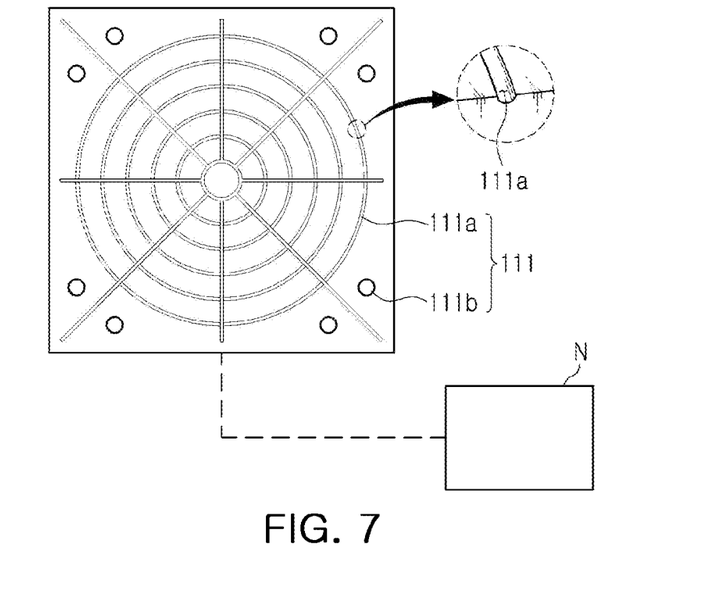
FIG. 7 is a front view illustrating a temporary adhering head of an adsorption temporary adhering unit in a taping apparatus for a secondary battery of the present disclosure.

FIG. 7 is a front view illustrating a temporary adhering head 111 of an adsorption temporary adhering unit 110 in a taping apparatus 1 for a secondary battery of the present disclosure. Referring to the drawing, a negative pressure passage 111a of a taping apparatus 1 for a secondary battery according to an embodiment of the present disclosure may be formed on an entire surface of a temporary adhering head 111 with which an adhesive member 3 is in contact, and may be formed to have a mesh shape or a radial shape.

For example, the negative pressure flow path 111a formed on one surface of the temporary adhering head 111 may be formed on the entire surface of the temporary adhering head 111, to secure an area for adsorbing the adhesive member 3 as much as possible.

To this end, the negative pressure flow path 111a may be formed to have a mesh shape or a radial shape. Since all flow paths may be formed to communicate with each other, negative pressures in a peripheral portion of the adhesive member 3 formed by sucking air by a negative pressure forming portion N may be uniformly formed in an entire area of the negative pressure flow path 111a.

In addition, the temporary adhering head 111 of the taping apparatus 1 according to an embodiment of the present disclosure may include a discharge terminal 111b connected to a ground and provided on one surface with which the adhesive member 3 is in contact, to discharge electrostatic charges of the adhesive member 3 to the ground.

As the discharge terminal 111b is formed in this manner, the problem in which the adhesive member 3 is blown by static electricity generated in the adhesive member 3 may be prevented, and the adhesive member 3 may be stably held to be temporarily adhered to the secondary battery cell 2.

Figure 8:
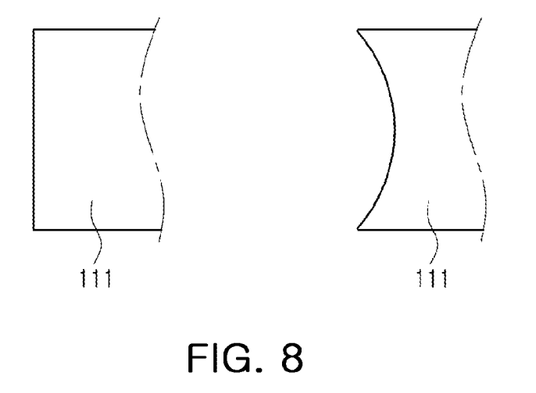
FIG. 8 is a side view illustrating several embodiments of one surface of which a temporary adhering head of an adsorption temporary adhering unit is in contact with an adhesive member, in a taping apparatus for a secondary battery of the present disclosure.

FIG. 8 is a side view illustrating several embodiments of one surface of which a temporary adhering head 111 of an adsorption temporary adhering unit 110 is in contact with an adhesive member 3, in a taping apparatus 1 for a secondary battery of the present disclosure. Referring to the drawings, a temporary adhering head 111 of the taping apparatus 1 according to an embodiment of the present disclosure may be formed to have a flat shape or a concave shape on one surface with which an adhesive member 3 is in contact.

For example, one surface of the temporary adhering head 111 may be formed to have a flat shape, to uniformly form adsorption force for adsorbing the adhesive member 3 by a negative pressure flow path 111a.

In addition, one surface of the temporary adhering head 111 may be formed to have a concave shape, to secure an area for adsorbing the adhesive member 3 by the negative pressure flow path 111a as much as possible.

Figure 9:
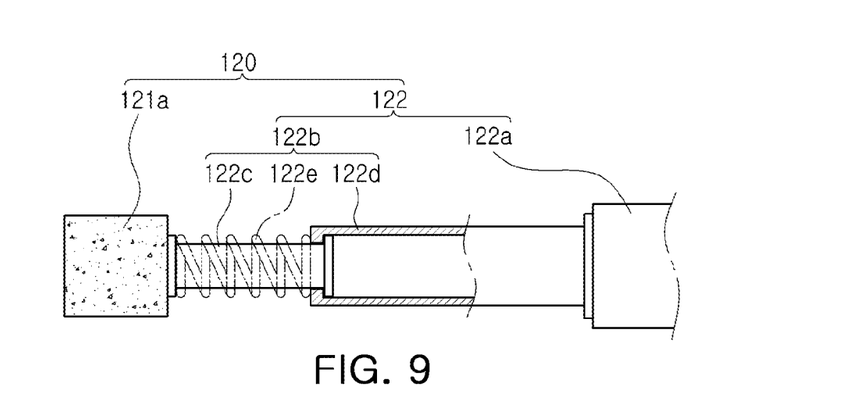
FIG. 9 is a side view illustrating a fully adhering supporter in a taping apparatus for a secondary battery of the present disclosure.

FIG. 9 is a side view illustrating a fully adhering supporter 120 in a taping apparatus 1 for a secondary battery of the present disclosure. Referring to the drawing, a fully adhering supporter 120 of the taping apparatus 1 according to an embodiment of the present disclosure may include a support head 121 and a support cylinder 122.

The support head 121 may be closely pressed against a portion of an adhesive member 3 attached to a secondary battery cell 2 by an adsorption temporary adhering unit 110. The support cylinder 122 may be coupled to the support head 121, and may pressurize the support head 121 in a direction of the secondary battery cell 2.

As a result, while a roller unit 200 fully adheres the adhesive member 3 to the secondary battery cell 2, the fully adhering supporter 120 may support the adhesive member 3. Therefore, the roller unit 200 may stably attach the adhesive member 3 to the secondary battery cell 2, and prevent the adhesive member 3 from being detached.

In this case, the support cylinder 122 of the taping apparatus 1 according to an embodiment of the present disclosure may elastically pressurize the support head 121 in the direction of the secondary battery cell 2.

In this manner, even when a shape of a portion of the secondary battery cell 2 pressurized by the fully adhering supporter 120 to support the adhesive member 3 is irregular, the adhesive member 3 may be stably supported.

To this end, the support cylinder 122 may include a support cylinder body 122a and a support rod 122b, and the support rod 122b may include a support inner rod 122c, a support outer rod 122d, and a support buffer spring 122e.

In this case, the support rod 122b may be coupled to the support head 121, and the support cylinder body 122a may be connected to the support rod 122b, to expand and contract the support rod 122b.

In addition, the support head 121 may be coupled to one end portion of the support inner rod 122c, the support outer rod 122d may be inserted into the other end portion of the support inner rod 122c, at least a portion thereof may be inserted into the support cylinder body 122a, and the support buffer spring 122e may be disposed between the support inner rod 122c and the support outer rod 122d, and may elastically pressurize the support inner rod 122c in an outward direction.

In addition, the support head 121 of the taping apparatus 1 according to an embodiment of the present disclosure may include a support block 121*a* formed of a urethane material or a sponge material.

A material of the support head 121 presented as described above may be a material that may be easily deformed in shape and may be restored to its original shape.

Therefore, in order to support the adhesive member 3, even when a shape of a portion of the secondary battery cell 2 pressed by the fully adhering supporter 120 is irregular, the adhesive member 3 may be stably supported.

Figure 10:
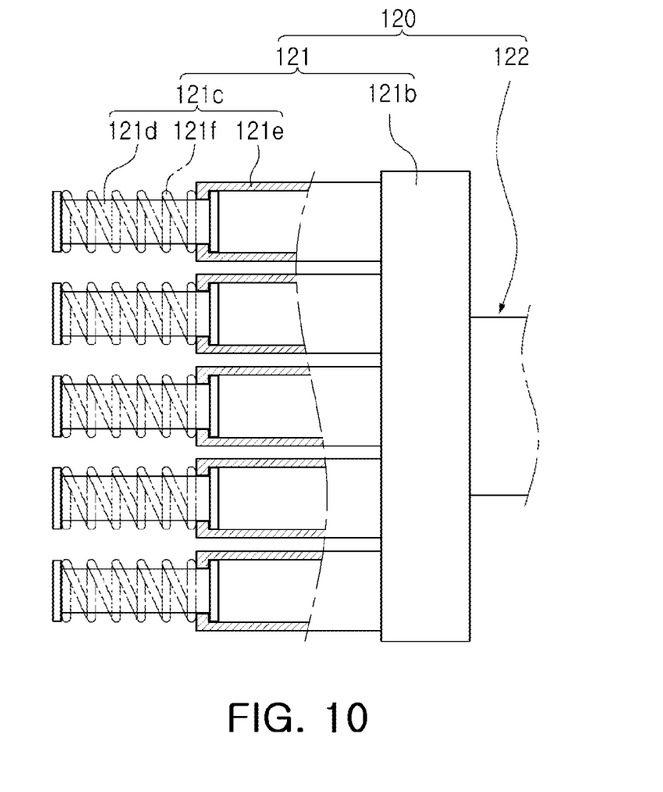
FIG. 10 is a side view illustrating an embodiment in which a fully adhering supporter includes a plurality of support fingers, in a taping apparatus for a secondary battery of the present disclosure.

FIG. 10 is a side view illustrating an embodiment in which a fully adhering supporter 120 includes a plurality of support fingers 121*c*, in a taping apparatus 1 for a secondary battery of the present disclosure. Referring to the drawing, a support head 121 of the taping apparatus 1 according to an embodiment of the present disclosure may include a support frame 121*b* and a support finger 121*c*.

The support frame 121*b* may be coupled to the support cylinder 122. The support finger 121*c* may be provided as a plurality of support fingers on the support frame 121*b*, and may be elastically pressurized in an outward direction.

For example, since the support head 121 may include the support frame 121*b* and the support finger 121*c*, even when a shape of a portion of the secondary battery cell 2 pressurized by the fully adhering supporter 120 to support the adhesive member 3 is irregular, the adhesive member 3 may be closely pressed against the secondary battery cell 2, while the adhesive member 3 is stably supported.

For example, when a portion supported by the fully adhering supporter 120 is a portion of the adhesive member 3 temporarily adhered to a folded sealing portion 2*b* of the secondary battery cell 2, the portion supported by the fully adhering supporter 120 may become an asymmetrical shape. In this case, a portion of the support finger 121*c* pressurized by the sealing portion 2*b* may protrude by a relatively short distance to support the adhesive member 3, and a portion of the support finger 121*c* pressurizing a side surface of the accommodating portion 2*a* adjacent to the sealing portion 2*b* may protrude by a relatively long distance to support the adhesive member 3.

Specifically, the support finger 121*c* may include a finger inner tab 121*d*, a finger outer tab 121*e*, and a finger spring 121*f*.

One end portion of the finger inner tab 121*d* may be in direct contact with the adhesive member 3 to pressurize and support the adhesive member 3 in the direction of the secondary battery cell 2. The other end portion of the finger inner tab 121*d* may be inserted into one end portion of the finger outer tab 121*e*, and the other end portion may be coupled to the support frame 121*b*. The finger spring 121*f* may be disposed between the finger inner tab 121*d* and the finger outer tab 121*e*, and may elastically pressurize the finger inner tab 121*d* in an outward direction.

FIG. 11 is a plan view illustrating an embodiment in which a support unit 100 includes an adsorption supporter 130 in a taping apparatus 1 for a secondary battery of the present disclosure. A support unit 100 of the taping apparatus 1 of the present disclosure may include an adsorption supporter 130.

The adsorption supporter 130 may adsorb an adhesive member 3 and move the adhesive member 3 in a direction of a secondary battery cell 2. When the roller unit 200 closely presses the adhesive member 3 against the secondary battery cell 2, the adsorption supporter 130 may pressurize a portion of the adhesive member 3 in the direction of the secondary battery cell 2 to support the portion of the adhesive member 3 in a state of being adhered to the secondary battery cell 2.

For example, the support unit 100 may be implemented by two configurations: temporary adhering of the adhesive member 3 by the adsorption temporary adhering unit 110 described above, and supporting of the adhesive member 3 by the fully adhering supporter 120 described above. The support unit 100 may be implemented using the two configurations as one configuration by the adsorption supporter 130.

To this end, the adsorption supporter 130 may form a flow path for forming a negative pressure, similarly to the temporary adhering head 111 of the adsorption temporary adhering unit 110 described above, may hold the adhesive member 3 to adhere a portion of the adhesive member 3 to the secondary battery cell 2, and may pressurize and support the adhesive member 3 held by a negative pressure in the direction of the secondary battery cell 2 while the adhesive member 3 is attached to the secondary battery cell 2 by the roller unit 200.

Hereinafter, a taping method for a secondary battery according to the present disclosure will be described. In this case, in a description of the taping method of the present disclosure, explanations overlapping the taping apparatus of the present disclosure described above will be omitted.

Figure 12:
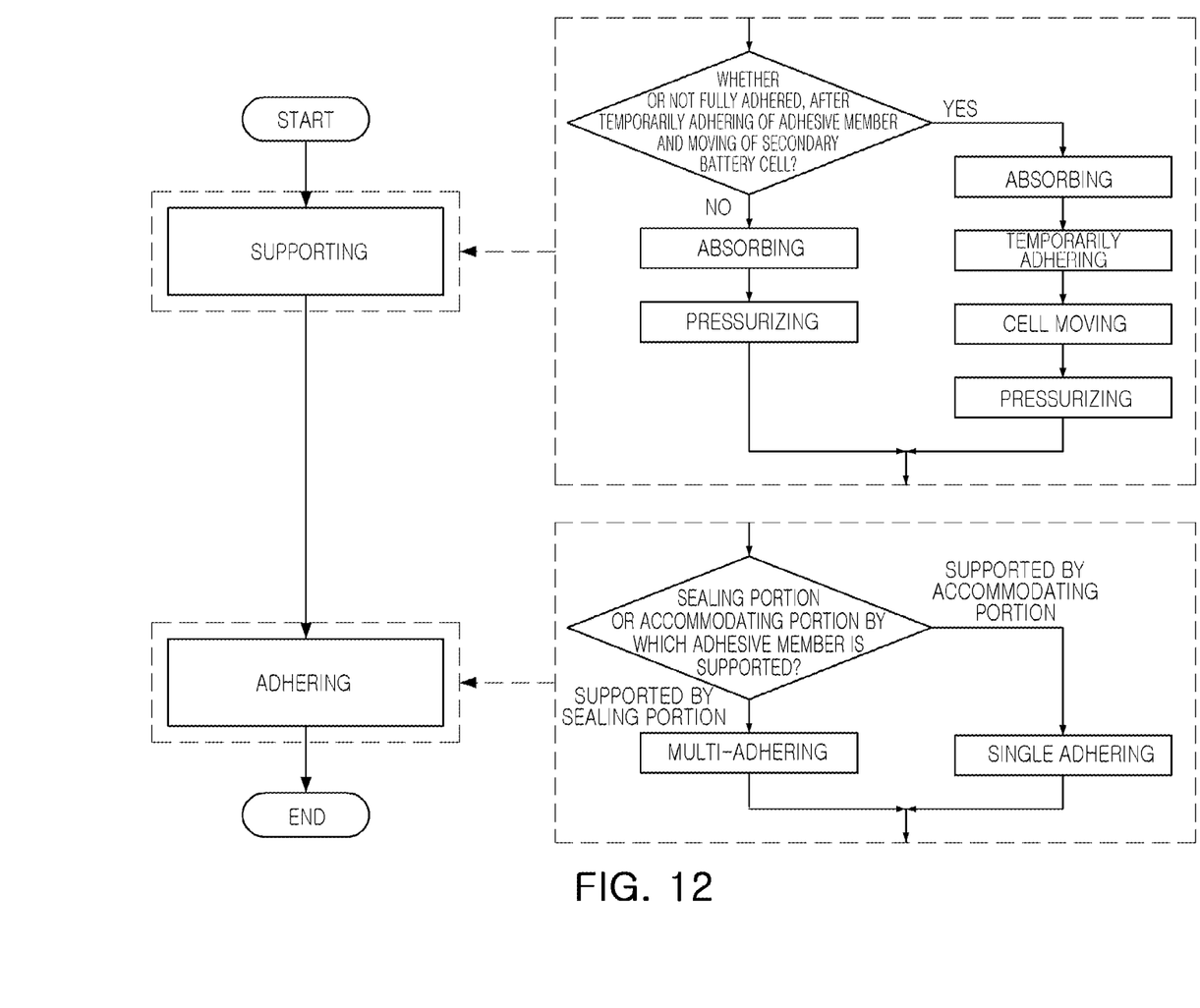
FIG. 12 is a flowchart illustrating a taping method for a secondary battery of the present disclosure.

FIG. 12 is a flowchart illustrating a taping method for a secondary battery of the present disclosure. Referring to the drawing, a taping method for a secondary battery according to another embodiment of the present disclosure, configured to adhere an adhesive member 3 cut and provided as a single sheet to a secondary battery cell 2, may include a supporting operation and an adhering operation.

In this case, in the supporting operation, a portion of the adhesive member 3 may be supported. In the adhering operation, the adhesive member 3 partially supported may be adhered to the accommodating portion 2*a* and the sealing portion 2*b*.

For example, in the taping method of the present disclosure, when the adhesive member 3 is adhered to the secondary battery cell 2, the adhesive member 3 may be supported by the supporting operation and may be adhered in the adhering operation.

Therefore, in the taping method of the present disclosure, the adhesive member 3 may be stably attached to the secondary battery cell 2, and may prevent occurrence of a problem in which the adhesive member 3 is detached.

In addition, the supporting operation may be configured differently depending on whether the secondary battery cell 2 is fully adhered by moving the secondary battery cell 2 after the adhesive member 3 is temporarily adhered.

For example, when the secondary battery cell 2 is fully adhered by moving the secondary battery cell 2 after the adhesive member 3 is temporarily adhered, the supporting operation may be configured to include an adsorption operation, a temporary adhering operation, a cell moving operation, and a pressurization operation.

In this case, the adsorption operation may be an operation of adsorbing the adhesive member 3. In the temporary adhering operation, the adhesive member 3 may move in the direction of the secondary battery cell 2, to adhere a portion of the adhesive member 3 to the secondary battery cell 2. The cell moving operation may be an operation of moving the secondary battery cell 2 to a position in which the roller unit 200 performing the adhering operation is disposed. The pressurization operation may be an operation of pressurizing a portion of the adhesive member 3 adhered to the secondary battery cell 2 in the direction of the secondary battery cell 2.

When the adhesive member 3 is supported while partially attaching to the secondary battery cell 2 in the supporting operation, the supporting operation may be configured to include an adsorption operation and a pressurization operation.

In this case, the adsorption operation may be an operation of adsorbing the adhesive member 3, and the pressurization operation may be an operation of moving the adhesive member 3 in the direction of the secondary battery cell 2, to adhere a portion of the adhesive member 3 to the secondary battery cell 2 and pressurize the portion of the adhesive member 3 in the direction of the secondary battery cell 2 at the same time.

In addition, in the adhering operation, a specific operation may be configured differently depending on where the adhesive member 3 is supported in the supporting operation.

For example, when the adhesive member 3 is supported by the sealing portion 2b in the supporting operation, the adhering operation may be configured to include a multi-adhering operation.

In this case, the multi-adhering operation may be an operation of adhering the adhesive member 3 supported by the sealing portion 2b to both surfaces of the accommodating portion 2a, respectively.

When the adhesive member 3 is supported by the accommodating portion 2a in the supporting operation, the adhering operation may be configured to include a single adhering operation.

In this case, the single adhering operation may be an operation of sequentially adhering the adhesive member 3 supported on one surface of the accommodating portion 2a to the sealing portion 2b and the other surface of the accommodating portion 2a.

According to an embodiment of the present disclosure, a taping apparatus fora secondary battery may have an advantage capable of attaching a piece of tape to the secondary battery cell in order to prevent a spring back.

According to an embodiment of the present disclosure, a taping apparatus fora secondary battery may have an advantage capable of stably attaching an adhesive member to a secondary battery cell and preventing occurrence of a problem in which the adhesive member is detached therefrom.

However, various advantages and effects of the present disclosure are not limited to the above-described contents, and can be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A taping apparatus for a secondary battery, configured to adhere an adhesive member cut and provided as a single sheet to a secondary battery cell including an accommodating portion in which an electrode assembly is accommodated and a sealing portion folded in a direction of the accommodating portion and sealing an edge of the accommodating portion, comprising:
    a support unit supporting a portion of the adhesive member; and
    a roller unit continuously moving in at least one direction of the accommodating portion and the sealing portion and adhering the adhesive member supported by the support unit to the secondary battery cell,
    wherein the support unit comprises:
    an adsorption temporary adhering unit adsorbing the adhesive member to move in a direction of the secondary battery cell, and adhering a portion of the adhesive member to the secondary battery cell;
    wherein the adsorption temporary adhering unit comprises:
    a temporary adhering head having a negative pressure flow path formed on one surface of the adhesive member and connected to an external negative pressure forming portion;
    wherein the negative pressure flow path is formed on one surface of the temporary adhering head contacting the adhesive member, formed to have a radial shape, and formed to communicate with each other,
    wherein the radial shape is formed by lines on the one surface of the temporary adhering head, and
    wherein the temporary adhering head is formed to have a concave shape on the one surface of the temporary adhering head.

2. The taping apparatus of claim 1, wherein the roller unit comprises:
    a first multi-roller moving while closely pressing the adhesive member in a direction of one surface of the accommodating portion; and
    a second multi-roller moving while closely pressing the adhesive member in a direction of the other surface of the accommodating portion.

3. The taping apparatus of claim 1, wherein the roller unit comprises a single roller moving while closely pressing the adhesive member adhered to and supported on one surface of the accommodating portion by the support unit, in a direction of the sealing portion and in a direction of the other surface of the accommodating portion.

4. The taping apparatus of claim 1, wherein the support unit comprises:
    a fully adhering supporter disposed to be spaced apart from the adsorption temporary adhering unit by a predetermined distance and provided adjacent to the roller unit.

5. The taping apparatus of claim 4, wherein the adsorption temporary adhering unit comprises:
    a temporary adhering cylinder coupled to the temporary adhering head and moving the temporary adhering head in a direction of the secondary battery cell.

6. The taping apparatus of claim 5, wherein the temporary adhering head comprises a discharge terminal connected to a ground and provided on the one surface of the temporary adhering head with which the adhesive member is in contact, to discharge electrostatic charges of the adhesive member to the ground.

7. The taping apparatus of claim 5, wherein the temporary adhering cylinder elastically pressurizes the temporary adhering head in the direction of the secondary battery cell.

8. The taping apparatus of claim 4, wherein the fully adhering supporter comprises:
    a support head in close contact with a portion of the adhesive member attached to the secondary battery cell by the adsorption temporary adhering unit; and
    a support cylinder coupled to the support head and pressurizing the support head in the direction of the secondary battery cell.

9. The taping apparatus of claim 8, wherein the support cylinder elastically pressurizes the support head in the direction of the secondary battery cell.

10. The taping apparatus of claim 8, wherein the support head comprises a support block formed of a urethane material or a sponge material.

11. The taping apparatus of claim 8, wherein the support head comprises:
- a support frame coupled to the support cylinder; and
- a plurality of support fingers provided on the support frame and elastically pressurized in an outward direction.

12. The taping apparatus of claim 1, wherein the support unit comprises an adsorption supporter adsorbing the adhesive member to move in a direction of the secondary battery cell, and supporting in a state in which a portion of the adhesive member is pressurized in the direction of the secondary battery cell to be adhered to the secondary battery cell, while the roller unit closely presses the adhesive member against the secondary battery cell.

\* \* \* \* \*